UNITED STATES PATENT OFFICE.

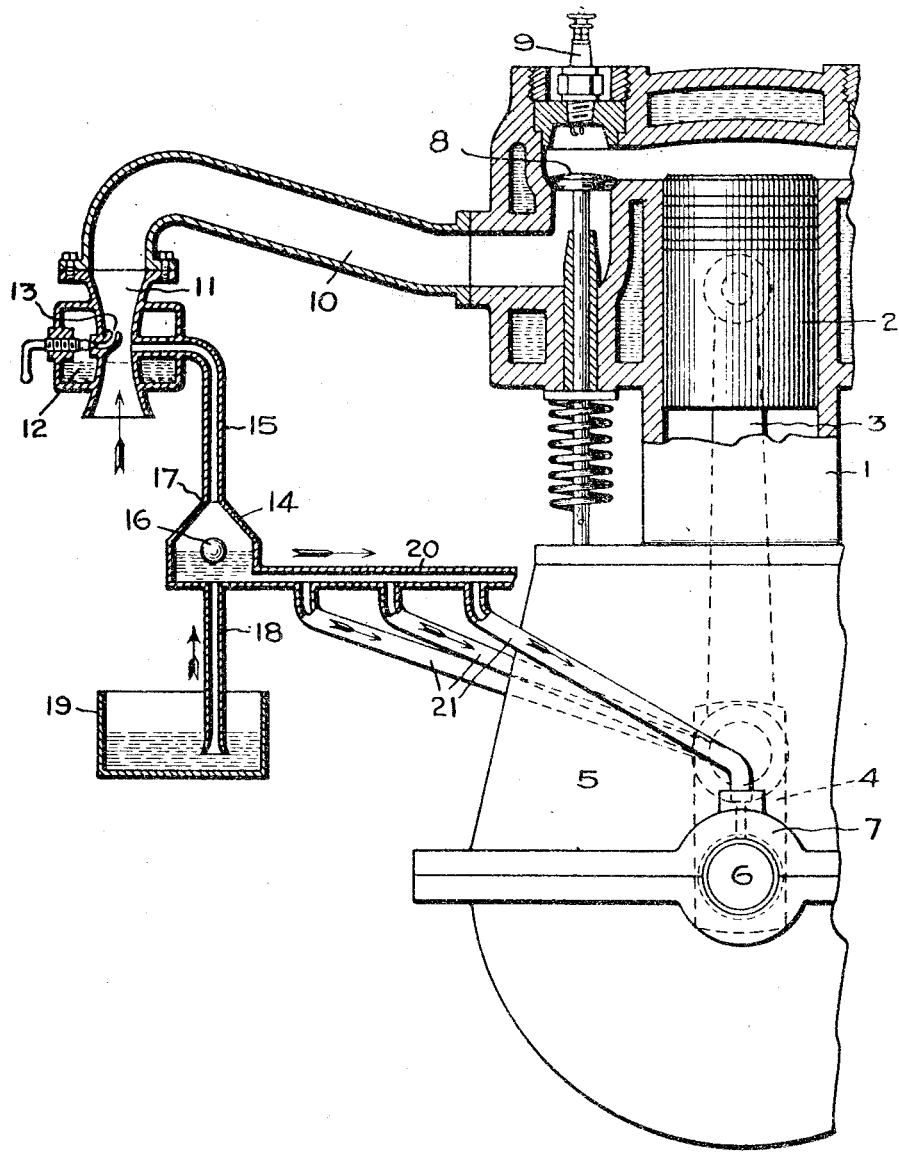

OTTO WINKLER, OF KÖPENICK, GERMANY, ASSIGNOR TO GENERAL ELECTRIC COMPANY, A CORPORATION OF NEW YORK.

AUTOMATIC LUBRICATING DEVICE.

1,029,331.  Specification of Letters Patent.  Patented June 11, 1912.

Application filed December 27, 1911. Serial No. 668,016.

*To all whom it may concern:*

Be it known that I, OTTO WINKLER, a subject of the King of Prussia, residing at Köpenick, Germany, have made certain new and useful Improvements in Automatic Lubricating Devices, of which the following is a specification.

The present invention relates to automatic lubricating devices and has for its object to improve and simplify their construction.

For consideration of what I believe to be novel and my invention, attention is directed to the accompanying specification and the claims appended thereto.

In the accompanying drawing is shown one of the embodiments of my invention as applied to an internal combustion engine.

1 indicates the cylinder of an internal combustion engine and 2 the piston thereof. The piston is connected by a rod 3 with the crank 4, the latter being located in a closed crank case 5.

6 indicates the main shaft of the engine that is supported in suitable bearings 7 of which one is shown.

8 indicates the admission valve and 9 the firing device.

The combustible mixture is supplied to the engine by the conduit 10. Attached to the conduit is a Venturi tube 11, the latter forming a mixing tube or mixing nozzle. Gasolene or other fuel is admitted to the tube from the chamber 12 by the small nozzle 13. On the down stroke of the piston, the admission valve 8 being open, a suction is created in the Venturi tube. This suction causes the fuel from the chamber 12 to be entrained with the air.

14 indicates a closed vessel of any suitable construction to which is connected a suction pipe 15, the latter opening into the Venturi tube 11 at a point where the velocity of the air is relatively high. The air as it flows through the tube causes a suction in the pipe 15.

In the vessel 14 is a float valve 16 that is arranged to engage its seat 17 and close the entrance to the suction pipe 15 when the level of the lubricant in the chamber exceeds a certain amount.

To the under side of the vessel is connected the lubricant carrying tube 18, the lower end of which is immersed in the lubricant contained in the reservoir 19.

20 indicates a manifold that is connected to and receives lubricant from the vessel 14. To the manifold are connected pipes 21 that lead to the various bearings on the engine or they may lead to the auxiliary devices that are driven by the engine and require such lubrication.

The operation is as follows: As the piston moves down, the valve 8 being open, a suction is created in the tube 15 and vessel 14 which sucks lubricant from the reservoir 19. The lubricant thus raised is delivered by the manifold 20 and the pipes 21 to the various bearings. The valve 16 is so arranged that it prevents lubricant from being sucked through the tube 15 into the Venturi tube 11. It will thus be seen that as soon as the engine starts the lubricating system starts into operation and stops as soon as the engine stops.

My invention is also applicable where the parts to be lubricated are located above the level of the lubricant in the reservoir 19 because the sucking of air through the manifold and pipes 21 will be prevented by the suction action of the bearings and by the capillary attraction of the oil in the bearings. By returning the lubricant from the bearings to the reservoir 19 when the latter is located below the level of the bearings the invention is applicable to an automatic circulation.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States is:—

1. An internal combustion engine having a fuel inlet conduit in combination with a lubricant containing vessel connected thereto and subjected to the suction effects existing in the conduit, a valve for preventing lubricant from entering the conduit from the vessel, and a discharge pipe that receives its supply of lubricant from the vessel.

2. In combination a conduit in which a suction is created, a chambered vessel connected to the conduit and subjected to the suction effects existing therein, a reservoir from which lubricant is raised to the vessel, a valve preventing lubricant from flowing from the vessel to said conduit, and one or more pipes conveying lubricant from the vessel to the parts to be lubricated.

3. In combination, a conduit in which a suction is created, a chambered vessel to which the effects of the suction are communicated, a reservoir below the vessel, a tube through which the suction effect in the vessel raises the lubricant, a valve which prevents lubricant in the vessel from entering the said conduit, and a pipe discharging lubricant from the vessel.

4. In combination, a conduit in which a suction is created by a moving machine part, a closed chambered vessel which is subjected to the suction effects existing in the conduit, a float valve in the vessel that is adapted to close the communication between the vessel and the conduit when the fluid therein reaches a certain level, a reservoir located below the vessel, a pipe extending downward from the vessel whose lower end is submerged in lubricant in the reservoir, and means for supplying lubricant from the vessel to the parts to be lubricated.

5. In combination an open ended tube through which fluid flows and creates a suction, a closed chambered vessel, a suction pipe connected at one end to the tube and at the other end to the vessel, a float valve in the vessel that controls the suction pipe, a pipe that freely discharges lubricant from the vessel, a lubricant tube that discharges into the vessel, and a reservoir containing lubricant into which the lubricant tube extends.

In witness whereof, I have hereunto set my hand.

OTTO WINKLER.

Witnesses:
 HERMANN TIETZ,
 ALBERT RINGER.